Figure 1:
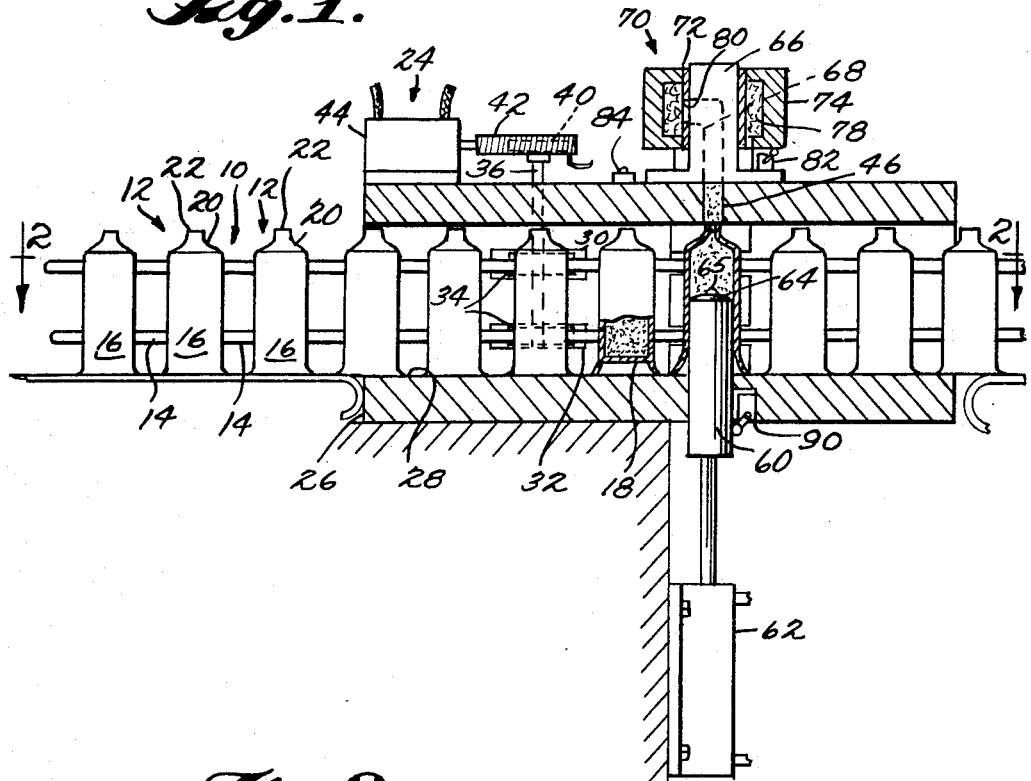

Sept. 20, 1966 M. L. ABEL 3,273,668
EXTRUSION APPARATUS AND METHOD
Filed Nov. 13, 1963

INVENTOR
MARTIN L. ABEL

BY Lane, Aitken, Dunner & Ziems
ATTORNEYS

United States Patent Office 3,273,668
Patented Sept. 20, 1966

3,273,668
EXTRUSION APPARATUS AND METHOD
Martin L. Abel, Oak Park, Mich., assignor to Permawick Company, Detroit, Mich., a corporation of Michigan
Filed Nov. 13, 1963, Ser. No. 323,308
5 Claims. (Cl. 184—1)

The present invention relates to an extruding apparatus and method, and more particularly to an apparatus and method for extruding a metered amount of oil-impregnated fibers into a bearing well.

An injectable wicking material comprising minute fibers impregnated with a suitable bearing oil is widely used for lubricating sleeve bearings for fractional horsepower motors. The material is injected by production machinery into bearing wells formed about the sleeve bearings in the end wells of the electric motors. This injectable wicking material is described and claimed in Patent No. 2,966,459, granted to Martin L. Abel on December 27, 1960, and a machine for injecting the material is described and claimed in Patent No. 3,053,421, granted to Martin L. Abel on September 11, 1962. In accordance with this latter patent, a large quantity of the injectable wicking material is stored in a continuously agitated hopper and delivered upon pressure from the hopper to a metering device which extrudes a metered amount of the injectable wicking material into each bearing well. However, this machine is best suited to the high production runs of large motor manufacturers, and is not economical for smaller production runs.

It is one object of the present invention to provide an apparatus and method for extruding metered amounts of the injectable wicking material into bearing wells which is well suited for use in smaller production runs.

It is another object of the invention to package the above described injectable wicking material in individual containers each holding a predetermined amount of the material so that each of the containers can be delivered to a simple extruding device for extruding the material therefrom into different bearing wells, the predetermined amount of material being equal to the material required by each of the bearing wells.

It is a further object of the invention to provide apparatus for extruding into a bearing well the injectable wicking material contained in the above described containers.

It is a still further object of the invention to provide a plurality of containers or cartridges each filled with a predetermined amount of the injectable wicking material and interconnected to form a belt similar to a machine-gun belt, the belt simplifying the filling of the cartridges and the extrusion of the material therefrom into bearing wells.

It is a still further object of the invention to provide an apparatus and method for extruding injectable wicking material into bearing wells which is simple, economical and efficient.

Figure 2:
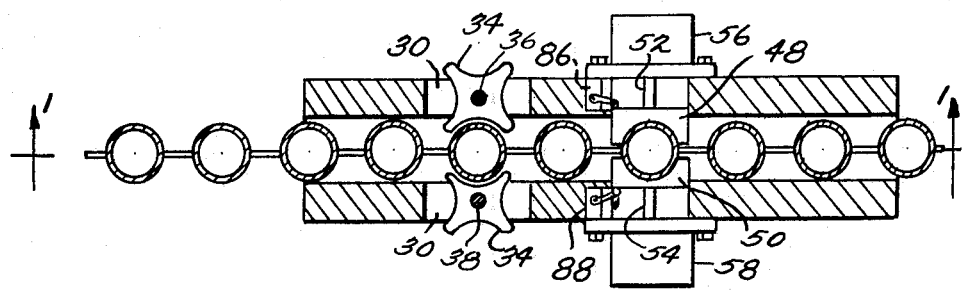

Other objects and features of novelty of the present invention will be specifically pointed out or will otherwise become apparent when referring, for a better understanding of the invention, to the following description taken in conjunction with the accompanying drawings, wherein:

FIG. 1 is a sectional view of an apparatus illustrating one embodiment of the invention; and FIG. 2 is a sectional view taken along the line 2—2 of FIG. 1.

Referring to FIGS. 1 and 2, a belt 10 is illustrated which comprises a plurality of cartridges or containers 12 interconnected with one another by straps 14. The belt 10 is made out of a suitable material impervious to oil such as a thin plastic material. The containers 12 are filled with a predetermined amount of the injectable wicking material 16 described in the aforementioned patent. The containers are substantially cylindrical with a bottom wall 18 recessed therein and a conically shaped upper surface 20 terminating in an outlet neck 22 which is normally sealed closed.

Each of the containers 12 is filled with a predetermined amount of the injectable wicking material 16 through the lower end thereof and the bottom wall 18 is sealed in position after the container is filled. The belt 10 can be rolled on itself and stored in the same manner that machine-gun belts are stored. If desired the containers could be filled through the neck 22, and the neck thereafter sealed off, but this would not be as advantageous as filling through the larger bottom opening.

To extrude the injectable wicking material 16 into bearings, a very simple extruding device 24 can be employed because of the fact that the injectable wicking material is already packaged in the separate containers in predetermined amounts. The extruding device 24 comprises a body 26 having an elongated passageway 28 which is large enough to enable the belt 10 to pass therethrough. Two opposed pairs of slots 30 and 32 are formed in the side walls of the body 26. The slots 30 are disposed on opposite sides of the upper strap 14 as viewed in FIG. 1 and the slots 32 are positioned on opposite sides of the lower straps 14. An indexing wheel 34 is positioned within each of the slots with the wheels on one side of the containers being rotatably driven by a common shaft 36 and the wheels on the other side being rotatably driven by a common shaft 38. Each of the shafts 36 and 38 have a pinion gear 40 on the upper end thereof (only one of which is shown in FIG. 1). Both pinion gears mesh with opposite sides of a common rack 42 which is reciprocated by an air cylinder 44, or the like. Each time the rack 42 is advanced by the air cylinder 44 it rotates the pinion gears (one clockwise and the other counter-clockwise) to rotate the indexing wheels to advance the containers 12 a predetermined distance through the passageway 28. The pinion gears 40 are connected to the shafts 36 and 38 by a one-way drive so that the pinion gears are not rotated when the rack 42 is retracted by the air cylinder 44.

An outlet orifice 46 is formed in the upper wall of the extruding device 24 in position to be aligned with the outlet neck 22 of one of the containers each time the containers are advanced. A pair of dies 48 and 50 are slidably supported in the side walls of the extruding device on opposite sides of the passageway 28 and are connected to the piston rods 52 and 54, respectively, of air cylinders 56 and 58 mounted on the side walls of the extruding device. When a container is advanced into alignment with the orifice 46 by the indexing wheels 34, the dies 48 and 50 are advanced by the air cylinders 56 and 58 to clamp or nest around the container. A piston 60 (FIG. 1) is slidably mounted in the wall of the extruding device beneath the container in position to be advanced by an air cylinder 62, or the like, to extrude the injectable wicking material 16 from the container out through the outlet orifice 46. The piston 60 has a cone-shaped end portion 64 which corresponds to the conically shaped end portion 20 of the containers 12 so that the piston can be advanced by the air cylinder to expel substantially all of the injectable wicking from the container. The dies 48 and 50 back up the conically shaped end portion 20 of the container so that when the material 16 is pressurized it will break the seal at the outlet neck 22 and pass out through the outlet orifice 46. A pointed projection 65 is formed on the cone-shaped end portion 64 of the piston 60 to pierce the bottom wall 18. Once pierced the bottom wall will tear apart from the center out as the piston advances to reduce the resistance offered by the bottom wall. After the material has been expelled from the container the piston 60 is retracted by the air cylinder 62 a sufficient distance to clear the passageway 28 so that the next container can be advanced into position by the indexing wheels 34. It will be observed in FIG. 1 that the lower ends of the containers are flared outwardly so that they will not interfere with the piston 60, the lower ends of the dies 48 and 50 also being flared to accommodate the flare on the containers.

A suitable injecting nozzle 66 having a passageway 68 therein is mounted on the extruding device 26 with the lower end of the passageway aligned with the outlet orifice 46 so that a bearing 70 can be slipped over the injection nozzle 66 in position to have the bearing well thereof filled with the injectable wicking material. The bearing 70 comprises a sleeve 72 press fit in the bore of a body 74 in a manner to close off an annular recess 78 in the body to form the bearing well. The sleeve 72 has a conventional window 80 therein to enable oil to be delivered from the bearing well to the surface of the shaft to be supported by the bearing. By aligning the window 80 with the upper end of the passageway 68 opening on the side of the injection nozzle 66, the bearing well can be filled with the injectable wicking material in a convenient manner.

As mentioned previously, each of the containers holds a predetermined amount of injectable wicking material 16 which, in the embodiment described corresponds to the amount of wicking material required to completely fill the bearing well 78 and window 80 of the bearing to be filled. With this arrangement, a bearing 70 will be completely filled with injectable wicking material each time the piston 60 is advanced to extrude the predetermined amount of injectable wicking material from the container aligned with the outlet orifice 46 by the indexing wheels 34. Of course, some of the injectable wicking material will remain in the passageway 68 in the injection nozzle 66 and in the outlet orifice 46 after a filled bearing has been removed. However, it is apparent that when the next bearing is positioned over the injection nozzle, this material will be extruded into the bearing well on the next advancement of the piston 60.

The entire operation of the extrusion device 24 is automatically controlled by limit switches 82–90. The limit switches control solenoid operated valves associated with each of the air cylinders to introduce the pressurized air to one end or the other of the air cylinders. The limit switch 82 is positioned on the bottom flange of the injection nozzle 66 in position to be actuated by the bearing 70 when it is lowered into position on the injection nozzle 66. When the limit switch 82 is actuated, the air cylinder 44 advances the rack 42 to advance the next container 12 into alignment with the outlet orifice 46 of the extruding device. At the end of its travel, the rack 42 actuates the limit switch 84 to cause the air cylinders 56 and 58 to advance the dies 48 and 50 to the position illustrated in FIG. 2 wherein they nest about the container aligned with the outlet orifice 46. Limit switches 86 and 88 are recessed in the side walls of the extruding device in position to be actuated when the dies 48 and 50 are advanced to the position illustrated in FIG. 2. The two limit switches 86 and 88 are interlocked with one another so that when both have been actuated, as described, the air cylinder 62 advances the piston 60 into the container to expel the injectable wicking material therefrom.

When the piston 60 reaches its uppermost position it trips the limit switch 90 to initiate a retraction cycle for retracting the air cylinders in a reverse order. The filled bearing 70 can then be removed. This releases the limit switch 82 to produce a signal for resetting the circuit for a new cycle which is initiated by positioning a new bearing 70 on the injection nozzle 66.

While it will be apparent that the embodiment of the invention disclosed herein is well calculated to fulfill the objects of the invention, it will be appreciated that the invention is susceptible to variation, modification and change without departing from the proper scope or fair meaning of the appended claims.

What is claimed is:

1. The method of extruding oil-impregnated fibers into bearing wells without separating the oil from the fibers, which includes the steps of, providing a plurality of containers each filled with a predetermined amount of oil-impregnated fibers, delivering each of said containers in sequence to an extruding device having an outlet orifice, and extruding the oil-impregnated fibers from each of the containers out through said outlet orifice as they enter the extruding device whereby bearings may be positioned in communication with said outlet orifice in sequence with the extruding device to have said oil-impregnated fibers extruded into the bearing wells thereof.

2. The method of extruding oil-impregnated fibers into bearing wells without separating the oil from the fibers, which includes the steps of, providing a plurality of containers each filled with a predetermined amount of oil-impregnated fibers, passing said containers in sequence through an extruding device, stopping each of said containers in said extruding device when it reaches a position aligned with an outlet orifice of the extruding device, and extruding the oil-impregnated wicking material from said containers out through said outlet orifice each time a container reaches said position whereby each time a container reaches said position a bearing can be positioned with the bearing well thereof in communication with said outlet orifice so as to be filled with said predetermined amount of oil-impregnated fibers.

3. The method of extruding oil-impregnated fibers into bearing wells, which includes the steps of, providing a plurality of containers each filled with a predetermined amount of oil-impregnated fibers, passing said containers one after the other through an extruding device, stopping each of said containers within said extruding device at a position aligned with an outlet orifice, extruding the oil-impregnated fibers out through said outlet orifice each time a container reaches said position, and placing the bearing well of a bearing in communication with said outlet orifice each time the oil-impregnated fibers are extruded from a container whereby a bearing well will be filled with said predetermined amount of oil-impregnated fibers with each extrusion.

4. The method of extruding oil-impregnated fibers into bearing wells, which includes the steps of, providing a plurality of containers each filled with a predetermined amount of oil-impregnated fibers, intermittently feeding said containers into an extruding device, surrounding each of said containers after it enters the extruding device to form an enclosure which communicates with an outlet orifice of the extruding device, and pressurizing the enclosed container to extrude the oil-impregnated fibers out through said outlet orifice.

5. The method of extruding oil-impregnated fibers into bearing wells, which includes the steps of, providing a container filled with a predetermined amount of oil-impregnated fibers, positioning said container within an extruding device having an outlet orifice with an outlet of said container in alignment with the outlet orifice of said extruding device, placing a bearing well of a bearing in communication with said outlet orifice, and extruding the oil-impregnated fibers out through said outlet orifice into said bearing well by applying pressure to a portion of said container.

References Cited by the Examiner

UNITED STATES PATENTS

| | | | |
|---|---|---|---|
| 52,752 | 2/1866 | Saeger | 141—284 |
| 1,719,806 | 7/1929 | Jeffrey et al. | 141—284 |
| 2,884,155 | 4/1959 | Hanson | 220—23.4 |
| 2,975,930 | 3/1961 | Pennington et al. | 220—23.4 |
| 3,077,242 | 2/1963 | Clinton et al. | 184—1 |
| 3,097,561 | 7/1963 | Stein | 184—1 |

LAVERNE D. GEIGER, *Primary Examiner.*

H. BELL, *Assistant Examiner.*